United States Patent
Kuo et al.

(10) Patent No.: US 7,213,099 B2
(45) Date of Patent: *May 1, 2007

(54) METHOD AND APPARATUS UTILIZING NON-UNIFORMLY DISTRIBUTED DRAM CONFIGURATIONS AND TO DETECT IN-RANGE MEMORY ADDRESS MATCHES

(75) Inventors: Chen-Chi Kuo, Pleasanton, CA (US); Sridhar Lakshmanamurthy, Sunnyvale, CA (US); Rohit Natarajan, Sunnyvale, CA (US); Kin-Yip Liu, San Jose, CA (US); Prashant R. Chandra, Sunnyvale, CA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 10/751,263

(22) Filed: Dec. 30, 2003

(65) Prior Publication Data
US 2005/0144413 A1    Jun. 30, 2005

(51) Int. Cl.
*G06F 12/06*    (2006.01)
(52) U.S. Cl. .......................................... 711/5
(58) Field of Classification Search ................... 711/5, 711/151, 217, 220, 170, 209
See application file for complete search history.

(56) References Cited

U.S. PATENT DOCUMENTS

| | | | |
|---|---|---|---|
| 3,373,408 A | | 3/1968 | Ling |
| 3,478,322 A | | 11/1969 | Evans |
| 3,792,441 A | | 2/1974 | Wymore et al. |
| 3,806,881 A | * | 4/1974 | Miwa et al. ................... 711/5 |
| 3,940,745 A | | 2/1976 | Sajeva |
| 4,045,782 A | | 8/1977 | Anderson et al. |
| 4,096,571 A | * | 6/1978 | Vander Mey ............... 711/151 |
| 4,130,890 A | | 12/1978 | Adam |
| 4,189,767 A | | 2/1980 | Ahuja |
| 4,400,770 A | | 8/1983 | Chan et al. |

(Continued)

FOREIGN PATENT DOCUMENTS

| | | |
|---|---|---|
| EP | 0379709 A2 | 8/1990 |
| EP | 0464715 A2 | 1/1992 |
| EP | 0633678 A1 | 1/1995 |
| EP | 0745933 A2 | 12/1996 |
| EP | 0809180 A2 | 11/1997 |
| EP | 1191445 | 3/2002 |

(Continued)

OTHER PUBLICATIONS

"Intel IXP2800 Network Processor For OC-192/10 Gbps network edge and core applications", Product Brief, (2002), pp. 1-6.

(Continued)

*Primary Examiner*—Pierre Bataille
*Assistant Examiner*—Paul Schlie

(57) ABSTRACT

Methods, software and systems to determine channel ownership and physical block location within the channel in non-uniformly distributed DRAM configurations and also to detect in-range memory address matches are presented. A first method, which may also be implemented in software and/or hardware, allocates memory non-uniformly between a number of memory channels, determines a selected memory channel from the memory channels for a program address, and maps the program address to a physical address within the selected memory channel. A second method, which may also be implemented in software and/or hardware, designates a range of memory to perform address matching, monitors memory accesses and when a memory access occurs with the specified range, perform a particular function.

22 Claims, 7 Drawing Sheets

U.S. PATENT DOCUMENTS

| | | |
|---|---|---|
| 4,514,807 A | 4/1985 | Nogi |
| 4,523,272 A | 6/1985 | Fukunaga et al. |
| 4,618,942 A * | 10/1986 | Tomimitsu ................. 711/220 |
| 4,745,544 A | 5/1988 | Renner et al. |
| 4,833,657 A | 5/1989 | Tanaka |
| 4,866,664 A | 9/1989 | Burkhardt, Jr. et al. |
| 4,935,867 A * | 6/1990 | Wang et al. ................. 711/217 |
| 5,008,808 A | 4/1991 | Fries et al. |
| 5,140,685 A | 8/1992 | Sipple et al. |
| 5,142,676 A | 8/1992 | Fried et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,166,872 A | 11/1992 | Weaver et al. |
| 5,168,555 A | 12/1992 | Byers et al. |
| 5,173,897 A | 12/1992 | Schrodi et al. |
| 5,255,239 A | 10/1993 | Taborn et al. |
| 5,263,169 A | 11/1993 | Genusov et al. |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,644,623 A | 7/1997 | Gulledge |
| 5,649,109 A | 7/1997 | Griesmer et al. |
| 5,649,157 A | 7/1997 | Williams |
| 5,659,687 A | 8/1997 | Kim et al. |
| 5,680,641 A | 10/1997 | Sidman |
| 5,689,566 A | 11/1997 | Nguyen |
| 5,699,537 A | 12/1997 | Sharangpani et al. |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,790,813 A | 8/1998 | Whittaker |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,799 A | 9/1998 | Zuravleff et al. |
| 5,812,868 A | 9/1998 | Moyer et al. |
| 5,813,031 A | 9/1998 | Chou et al. |
| 5,828,746 A | 10/1998 | Ardon |
| 5,828,863 A | 10/1998 | Barrett et al. |
| 5,829,033 A | 10/1998 | Hagersten et al. |
| 5,832,215 A | 11/1998 | Kato et al. |
| 5,835,755 A | 11/1998 | Stellwagen, Jr. |
| 5,835,928 A | 11/1998 | Auslander et al. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kim |
| 5,961,628 A | 10/1999 | Nguyen et al. |
| 5,970,013 A | 10/1999 | Fischer et al. |
| 5,978,838 A | 11/1999 | Mohamed et al. |
| 5,978,874 A | 11/1999 | Singhal et al. |
| 5,983,274 A | 11/1999 | Hyder et al. |
| 6,012,151 A | 1/2000 | Mano |
| 6,014,729 A | 1/2000 | Lannan et al. |
| 6,023,742 A | 2/2000 | Ebeling et al. |
| 6,029,170 A | 2/2000 | Garger et al. |
| 6,047,334 A | 4/2000 | Langendorf et al. |
| 6,058,168 A | 5/2000 | Braband |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,076,129 A | 6/2000 | Fenwick et al. |
| 6,079,008 A | 6/2000 | Clery, III |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,112,016 A | 8/2000 | MacWilliams et al. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,173,349 B1 | 1/2001 | Qureshi et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,602 B1 | 4/2001 | Wicki et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,279 B1 | 4/2001 | Nishimura et al. |
| 6,247,025 B1 | 6/2001 | Bacon |
| 6,247,040 B1 | 6/2001 | Born et al. |
| 6,247,086 B1 | 6/2001 | Allingham |
| 6,249,829 B1 | 6/2001 | Bloks et al. |
| 6,256,713 B1 | 7/2001 | Audityan et al. |
| 6,272,616 B1 | 8/2001 | Fernando et al. |

| | | |
|---|---|---|
| 6,275,505 B1 | 8/2001 | O'Loughlin et al. |
| 6,278,289 B1 | 8/2001 | Guccione et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,311,256 B2 | 10/2001 | Halligan et al. |
| 6,324,624 B1 | 11/2001 | Wolrich et al. |
| 6,345,334 B1 | 2/2002 | Nakagawa et al. |
| 6,347,344 B1 | 2/2002 | Baker et al. |
| 6,356,962 B1 | 3/2002 | Kasper |
| 6,360,262 B1 | 3/2002 | Guenthner et al. |
| 6,366,978 B1 | 4/2002 | Middleton et al. |
| 6,373,848 B1 | 4/2002 | Allison et al. |
| 6,389,449 B1 | 5/2002 | Nemirovsky et al. |
| 6,393,483 B1 | 5/2002 | Latif et al. |
| 6,401,149 B1 | 6/2002 | Dennin et al. |
| 6,415,338 B1 | 7/2002 | Habot |
| 6,426,940 B1 | 7/2002 | Seo et al. |
| 6,427,196 B1 | 7/2002 | Adiletta et al. |
| 6,430,626 B1 | 8/2002 | Witkowski et al. |
| 6,430,646 B1 | 8/2002 | Thusoo et al. |
| 6,434,145 B1 | 8/2002 | Opsasnick et al. |
| 6,449,289 B1 | 9/2002 | Quicksall |
| 6,457,078 B1 | 9/2002 | Magro et al. |
| 6,463,072 B1 | 10/2002 | Wolrich et al. |
| 6,490,642 B1 | 12/2002 | Thekkath et al. |
| 6,529,999 B1 | 3/2003 | Keller et al. |
| 6,532,509 B1 | 3/2003 | Wolrich et al. |
| 6,539,439 B1 | 3/2003 | Nguyen et al. |
| 6,552,826 B2 | 4/2003 | Adler et al. |
| 6,560,667 B1 | 5/2003 | Wolrich et al. |
| 6,570,877 B1 | 5/2003 | Kloth et al. |
| 6,577,542 B2 | 6/2003 | Wolrich et al. |
| 6,581,124 B1 | 6/2003 | Anand et al. |
| 6,584,522 B1 | 6/2003 | Wolrich et al. |
| 6,587,906 B2 | 7/2003 | Wolrich et al. |
| 6,606,704 B1 | 8/2003 | Adiletta et al. |
| 6,625,654 B1 | 9/2003 | Wolrich et al. |
| 6,628,652 B1 | 9/2003 | Chrin et al. |
| 6,629,237 B2 | 9/2003 | Wolrich et al. |
| 6,631,430 B1 | 10/2003 | Wolrich et al. |
| 6,631,462 B1 | 10/2003 | Wolrich et al. |
| 6,633,938 B1 | 10/2003 | Rowlands et al. |
| 6,643,726 B1 | 11/2003 | Patkar et al. |
| 6,654,836 B1 | 11/2003 | Misra et al. |
| 6,661,794 B1 | 12/2003 | Wolrich et al. |
| 6,661,795 B1 | 12/2003 | Adas et al. |
| 6,667,920 B2 | 12/2003 | Wolrich et al. |
| 6,668,311 B2 | 12/2003 | Hooper et al. |
| 6,668,317 B1 | 12/2003 | Bernstein et al. |
| 6,671,761 B2 | 12/2003 | Kim |
| 6,671,827 B2 | 12/2003 | Guilford et al. |
| 6,678,248 B1 | 1/2004 | Haddock et al. |
| 6,681,300 B2 | 1/2004 | Wolrich et al. |
| 6,694,380 B1 | 2/2004 | Wolrich et al. |
| 6,697,923 B2 | 2/2004 | Chen et al. |
| 6,724,767 B1 | 4/2004 | Chong et al. |
| 6,725,313 B1 | 4/2004 | Wingard et al. |
| 6,728,845 B2 | 4/2004 | Adiletta et al. |
| 6,738,831 B2 | 5/2004 | Wolrich et al. |
| 6,754,662 B1 | 6/2004 | Li |
| 6,754,795 B2 | 6/2004 | Chen et al. |
| 6,781,992 B1 | 8/2004 | Rana et al. |
| 6,785,843 B1 | 8/2004 | McRae et al. |
| 6,823,399 B2 | 11/2004 | Horiguchi et al. |
| 6,826,180 B1 | 11/2004 | Bergantino et al. |
| 6,847,645 B1 | 1/2005 | Potter et al. |
| 6,868,476 B2 | 3/2005 | Rosenbluth et al. |
| 6,941,438 B2 | 9/2005 | Wolrich et al. |
| 6,958,973 B1 | 10/2005 | Chen et al. |
| 2001/0043614 A1 | 11/2001 | Viswanadham et al. |
| 2003/0012198 A1 | 1/2003 | Kaganoi et al. |
| 2003/0041216 A1 | 2/2003 | Rosenbluth et al. |
| 2003/0046488 A1 | 3/2003 | Rosenbluth et al. |
| 2003/0065862 A1 | 4/2003 | Wyland |
| 2003/0078950 A1 | 4/2003 | Abernathy et al. |
| 2003/0105899 A1 | 6/2003 | Rosenbluth et al. |
| 2003/0145155 A1 | 7/2003 | Wolrich et al. |
| 2003/0145159 A1 | 7/2003 | Adiletta et al. |
| 2004/0034743 A1 | 2/2004 | Wolrich et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0139290 A1 | 7/2004 | Wolrich et al. |
| 2005/0132132 A1 | 6/2005 | Rosenbluth et al. |
| 2006/0156303 A1 | 7/2006 | Hooper |

FOREIGN PATENT DOCUMENTS

| | | |
|---|---|---|
| JP | 59111533 A2 | 6/1984 |
| WO | WO-09415287 A3 | 7/1994 |
| WO | WO-9738372 A1 | 10/1997 |
| WO | WO-0115718 A1 | 3/2001 |
| WO | WO-0116769 A1 | 3/2001 |
| WO | WO-0116770 A1 | 3/2001 |
| WO | WO-0116782 A3 | 3/2001 |
| WO | WO-0148596 A3 | 7/2001 |
| WO | WO-0148606 A3 | 7/2001 |
| WO | WO-0148619 A3 | 7/2001 |
| WO | WO-0150247 A3 | 7/2001 |
| WO | WO-0150679 A3 | 7/2001 |

OTHER PUBLICATIONS

U.S. Appl. No. 10/340,220, "Memory Interleaving", filed Jan. 10, 2003.

"C-5 Network Processor Architecture Guide", *C-Port Coproration, Freescale Semiconductor, Inc. Part No. C5NPD0-AG/D*, (May 31, 2001),642 pages.

"Intel IXP1200 Network Processor Family", *Hardware Reference Manual*, (Dec. 2001),272 pages.

"IXP1200 Network Processor", *Data Sheet*, (Mar. 2000),144 pages.

Bowden, Romilly, "What is HART?", *Romilly's Hart and Fieldbus Website, Online!*, [www.romilly.co.uk.whathart.htm], (1997).

Byrd, et al., "Multithread Processor Architectures", *IEEE Spectrum*, vol. 32, No. 8., New York,(Aug. 1, 1995),pp. 38-46.

Chang, Shu-Ping, et al., "An Overview of the Pipelined Common Buffer Architecture (PCBA) for Memory Based Packet/Cell Switching Systems", *IEEE*, (1994),288-297.

Doyle, et al., "Microsoft Press Computer Dictionary, 2nd ed.", *Microsoft Press*, Redmond, Washington, USA, (1994),p. 326.

Fillo, et al., "The M-Machine Multicomputer", *IEEE Proceedings of MICRO-28*, (1995),pp. 146-156.

Frazier, Gregory L., et al., "The Design and Implementation of a Multi-Queue Buffer for VLSI Communication Switches", *IEEE*, (1989),466-471.

Gomez, et al., "Efficient Multithreaded User-Space Transport for Network Computing: Design and Test of the TRAP Proctocol", *Journal of Parallel and Distributed Computing*, vol. 40, No. 1, Academic Press, Duluth, Minnesota, USA,(Jan. 10, 1997),pp. 103-117.

Hart, "Field Communication Protocol, Application Guide", http://lhc-div.web.cern.ch/lhc-div/IAS/WS/WorldFip/Labo/appguide.pdf, (1999), 79 pages.

Haug, et al., "Reconfigurable hardware as shared resource for parallel threads", *IEEE Symposium on FPGAs for Custom Computing Machines*, (1998).

Hauser, et al., "Garp: a MIPS processor with a reconfigurable coprpcessor", *Proceedings of the 5.sup.th Annual IEEE Symposium on Field-Programmable Custom Computing Machines*, (1997).

Hyde, R., et al., "Overview of Memory Management", *Byte*, vol. 13, No. 4, (1998),pp. 219-225.

Lin, Yu-Sheng, et al., "Queue Management for Shared Buffer and Shared Multi-Buffer ATM Switches", *IEEE*, (1996),688-695.

Litch, et al., "StrongARMing Portable Communications", *IEEE Micro*, (1998),pp. 48-55.

Schmidt, et al., "The Performance of Alternative Threading Architectures for Parallel Communication Subsystems", *Internet Document, Online!*, (Nov. 13, 1998).

Thistle, et al., "A Processor Architecture for Horizon", *IEEE*, (1998),pp. 35-41.

Tremblay, et al., "A Three Dimensional Register File for Superscalar Processors", *IEEE Proceedings of the 28.sup.th Annual Hawaii International Conference on System Sciences*, (1995),pp. 191-201.

Trimberger, et al., "A time-multiplexed FPGA", *Proceedings of the 5.sup.th Annual IEEE Symposium on Field-Programmable Custom Computing Machines*, (1998).

Turner, et al., "Design of a High Performance Active Router", *Internet Document, Online!*, (Mar. 18, 1999).

Vibhatavanijt, et al., "Simultaneous Multithreading-Based Routers", *Proceedings of the 2000 International Conference of Parallel Processing*, Toronto, Ontario, Canada,(Aug. 21-24, 2000),pp. 362-359.

Wazlowski, et al., "PRSIM-II computer and architecture", *IEEE Proceedings, Workshop on FPGAs for Custom Computing Machines*, (1993).

Wolrich, et al., U.S. Appl. No. 09/473,571, filed Dec. 28, 1999.

\* cited by examiner

METHOD AND APPARATUS UTILIZING NON-UNIFORMLY DISTRIBUTED DRAM CONFIGURATIONS AND TO DETECT IN-RANGE MEMORY ADDRESS MATCHES

CROSS REFERENCE TO RELATED APPLICATIONS

Not Applicable

STATEMENT REGARDING FEDERALLY SPONSORED RESEARCH

Not Applicable

FIELD OF THE INVENTION

The present disclosure relates generally to memory channel organization and allocation for use by a network processor and more specifically to memory channel organization and utilization in a non-uniformly distributed configuration as well as to a method for detecting in-range memory address matches.

BACKGROUND OF THE INVENTION

The Internet, as well as other networks, has become more complicated with additional bandwidth requirements, a larger number users, and increasingly elaborate uses. In order to handle these increased demands, new protocols and network data types have been developed. Network Processors (NPs), which are well known to those of ordinary skill in the art, are used to perform various tasks such as processing network packets, network data streams, and network objects to accomplish specific tasks.

The functions that the NP performs can be generally categorized into physical-layer functions, switching and fabric-control functions, packet-processing functions, and system control functions. In some instances, the packet-processing functions can be further subdivided into network-layer packet processing and higher-layer packet processing.

The physical-layer functions handle the actual signaling over the network media connections, such as an Ethernet port, an optical fiber connection, or a coaxial T3 connection. The NP converts the data packets into signals that are transmitted over the physical media. These often work according to a media access control (MAC) and physical layer protocols such as Ethernet, Synchronous Optical Network (SONET), Time Division Multiple Access (TDMA), Code Division Multiple Access (CDMA), and the like.

The switching and fabric-control functions performed by the NP direct data from the ingress port of the NP to an appropriate egress port of the NP. Further functions include performing operations, such as queuing the data in appropriate order or priority at these ports.

The packet-processing functions performed by the NP handle the processing of various network protocols. Thus, a packet containing instructions on allocating a stream for continuous guaranteed delivery is handled at this level.

System-control or host-processing functions performed by the NP include the management of other components of the hardware unit, such as power management, device control, console port management, and the like.

NP processing typically includes other functions as well. A typical router application involves receiving packets, performing route table look-ups, packet classification, packet metering, congestion avoidance, packet transmit scheduling and packet transmittal. NPs should provide sufficient processing power in order to run network applications efficiently and cost-effectively.

BRIEF DESCRIPTION OF THE DRAWINGS

The foregoing features of the present disclosure may be more fully understood from the following description of the drawings in which.

DETAILED DESCRIPTION OF THE INVENTION

Figure 1:
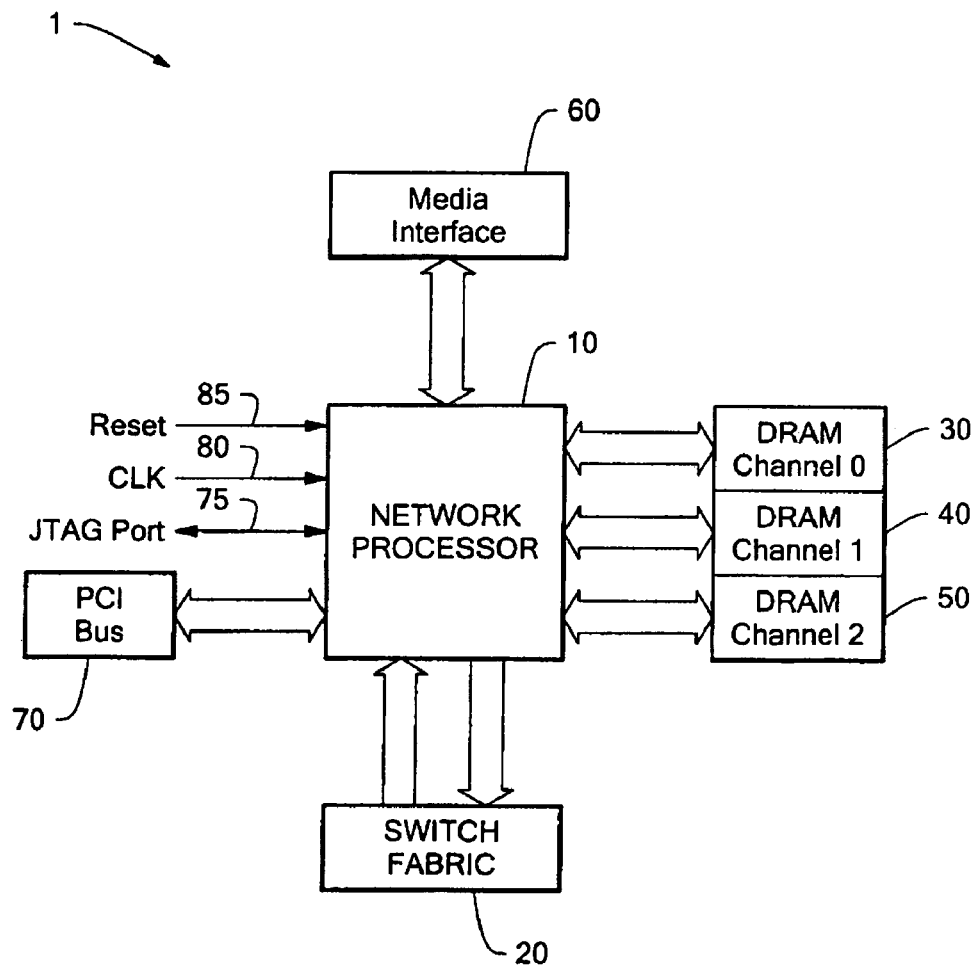
FIG. 1 is a block diagram of a network processor system.

Referring to FIG. 1, a memory unit in a network processor 10 is responsible for controlling the off chip DRAM 30, 40 and 50 and provides a mechanism for other functional units in the network processor to access the DRAM. A network processor 10 may have multiple controllers each of which manages one of the DRAM channels.

Typically, DRAM channels associated with a network processor are used for packet data buffering. For a typical application utilizing an NP, cells/packets arrive at a specified line rate. At a line rate of 2.5 Gigabytes per second (Gbps) a 40 byte packet may arrive every 16 nanoseconds (ns). As line rates increase there is a concomitant increase in packet arrival rate. At a line rate of 10 Gbps packet arrival increases to every 4 ns, and at a line rate of 40 Gbps the packet arrival rate increases to 1 ns. The NP performs the layer 3 through layer 7 processing on these packets. The NP also transmits the processed packets in the desired sequence and at the desired rate. If the NP cannot keep up with the arrival rate, packets are dropped or otherwise lost.

Each of the controllers independently accesses its own DRAMs, and can operate concurrently with the other controllers (i.e. they are not operating as a single, wider memory). The memory space is guaranteed to be contiguous from a software perspective. Hardware interleaving (also known as striping) of addresses is done to provide balanced access to all populated channels with DRAM commands. Each channel is striped at 128-byte blocks, although it should be appreciated that other striping sizes may also be used.

Interleaving is a technique used to improve memory performance. Memory interleaving increases bandwidth by allowing simultaneous access to more than one chunk of memory. This improves performance because the processor can transfer more information to/from memory in the same amount of time, and helps alleviate the processor-memory bottleneck that can be a major limiting factor in overall performance.

Interleaving works by dividing the memory into multiple channels. When a read or write is begun to one channel, a read or write to other channels can be overlapped with the first one. In order to get the best performance from this type of memory system, consecutive memory addresses are spread over the different channels.

While the exemplary embodiment shown and describes herein shows three memory channels, it is understood that any number of memory channels could be used. To fully utilize the address space the network processor supports a non-uniformly defined configuration wherein channel 0 is assigned twice the memory capacity of channel 1 and wherein channel 2 is assigned the same capacity as channel 1. Another reason the non-uniform configuration is used is due to the limited granularity of DRAM modules. For example, there is no DRAM module having a size of 1.33 GB to uniformly populate three channels and fully utilize a 4 GB address space. For example, a system of 4 G-Byte memory is populated with 2 G-Byte, 1 G-Byte, and 1 G-Byte capacity respectively in channel 0, 1, and, 2. Table 1 below shows the allocation of memory space within the three channels for different memory sizes

TABLE 1

| Total DRAM capacity in 3 channels | channel 0 | channel 1 | channel 2 |
|---|---|---|---|
| 512 MB | 256 MB | 128 MB | 128 MB |
| 1 GB | 512 MB | 256 MB | 256 MB |
| 2 GB | 1 GB | 512 MB | 512 MB |
| 4 GB | 2 GB | 1 GB | 1 GB |

When all three channels are active and one of the channels is populated with twice the capacity as in the other two channels, the interleave scheme selecting the channel for each block is shown in Table 2 and in the code segment below.

TABLE 2

Bits for Channel Selection and Remapping Location for Different Memory Configurations

| Total DRAM capacity in 3 channels | bit[a:b] | Address (X) |
|---|---|---|
| 512 MB | bit[28:27] | 128 MB |
| 1 GB | bit[29:28] | 256 MB |
| 2 GB | bit[30:29] | 512 MB |
| 4 GB | bit[31:30] | 1 GB |

Address Re-arrangement for Non-uniform Configurations with Three Active Channels Line 1: // bit[a:b] and Address(X) are configuration-specific, as shown in Table 2.
Line 2: if(address bit[a:b] == 11){
Line 3: the address is mapped to channel 0;
Line 4: the location in the channel 0 is Address(X) + (~(0x3<<b)&address)
Line 5: }
Line 6: else{
Line 7: use sum modulo-3 reduction shown in FIG. 3 to decide channel;
Line 8: (address bits [31:7] are summed as modulo 3, and the remainder is the
Line 9: selected channel number. This ensures that adjacent blocks are mapped to
Line 10: different channels.)
Line 11: use Table 3 to decide address re-arrangement;
Line 12: }

Lines 1–5 of the code segment are used for program addresses that will map into a physical address within the second half (non-interleaved portion) of the first channel. For example a write to a program address of CF000000 will be mapped to physical address 4F000000 within channel 0 for a system having 4 GB of memory wherein channel 0 has 2 GB of memory while channels 1 and 2 have 1 GB of main memory each. It is understood that addresses are in Hexadecimal unless otherwise stated.

In this scenario, bits [a:b] correspond to bits [31:30] and Address X is 40000000. Line 4 of the code segment states that the physical location in channel 0 that the program address maps to is: Address X+(~(0x3<<b)&address). The portion of the code that states "~(0x3<<b)" translates to left shifting the bits 0x3a total of b times and negating the value. Since b is 30, the 0x3 is right shifted 30 times and negated, then the remainder of the address is appended to it, giving the value 5F000000. This is then added to Address X (40000000 in this example) yielding a physical address within channel 0 of 1F000000.

Lines 6–12 of the code segment are used to interleave program addresses into the appropriate channel of the lower ¾ of memory. Address bits 31:7 are summed as modulo 3 wherein the remainder is the appropriate channel number. The program address must then be mapped into a physical address within the selected channel. This is done in accordance with table 3 below.

TABLE 3

Address Rearrangement for 3 Way Interleave

| | | Add this amount to shifted 31:7 (based on amount of memory on the channel) Address within channel is {shifted 31:7 + table_value), 6:0} | | | | |
|---|---|---|---|---|---|---|
| When these bits of address are all "1"s. | Shift 31:7 right by this many bits | 64 MB | 128 MB | 256 MB | 512 MB | 1 GB |
| 30:7 | 26 | N/A | N/A | N/A | N/A | 8388607 |
| 28:7 | 24 | N/A | N/A | 2097151 | 4194303 | 8388606 |
| 26:7 | 22 | 524287 | 1048575 | 2097150 | 4194300 | 8388600 |
| 24:7 | 20 | 524286 | 1048572 | 2097144 | 4194288 | 8388576 |
| 22:7 | 18 | 524280 | 1048560 | 2097120 | 4194240 | 8388480 |
| 20:7 | 16 | 524256 | 1048512 | 2097024 | 4194048 | 8388096 |
| 18:7 | 14 | 524160 | 1048320 | 2096640 | 4193280 | 8386560 |
| 16:7 | 12 | 523776 | 1047552 | 2095104 | 4190208 | 8380416 |
| 14:7 | 10 | 522240 | 1044480 | 2088960 | 4177920 | 8355840 |
| 12:7 | 8 | 516096 | 1032192 | 2064384 | 4128768 | 8257536 |

TABLE 3-continued

Address Rearrangement for 3 Way Interleave

| When these bits of address are all "1"s. | Shift 31:7 right by this many bits | Add this amount to shifted 31:7 (based on amount of memory on the channel) Address within channel is {shifted 31:7 + table_value), 6:0} | | | | |
|---|---|---|---|---|---|---|
| | | 64 MB | 128 MB | 256 MB | 512 MB | 1 GB |
| 10:7 | 6 | 491520 | 983040 | 1966080 | 3932160 | 7864320 |
| 8:7 | 4 | 393216 | 786432 | 1572864 | 3145728 | 6291456 |
| None | 2 | 0 | 0 | 0 | 0 | 0 |

An example of performing the channel determination and block allocation within the channel for the non-uniformly allocation of memory between three channels will be discussed. While the example described below uses three memory channels with a total of 4 GB of memory distributed such that channel 0 contains 2 GB of memory, channel 1 contains 1 GB of memory and channel 2 contains 1 GB of memory, it is understood that the same concepts apply to other systems having different number of memory channels, different amounts of memory or a different allocation of memory between the channels.

In this example the program address to be mapped is address 25B42F80. Since this example uses 128 byte blocks for channel striping, bits 6:0 of the program address comprise the byte offset and are not used as part of the channel determination. Bits 30:7 of the address 25B42F80 are represented as shown:

010 0101 1011 0100 0010 111 11

The above address bits are grouped into pairs and a 2 bit to 2 bit recoding is performed in accordance with Table 4 below.

TABLE 4

| 2 bit group to be recoded | 2 bit recode |
|---|---|
| 00 | 00 |
| 01 | 01 |
| 10 | 10 |
| 11 | 00 |

Thus the above address bits 30:7 are transformed from:
01 00 10 11 01 10 00 00 10 11 11 to:
01 00 10 00 0110 10 00 01 01 00 00

This set of binary digits is then grouped into groups of four:
0100 1000 0110 1000 0101 0000

At this stage of the process, a 4 bit-to-2 bit reduction is performed on the above data in accordance with Table 5 below:

TABLE 5

| 4 bit group to be reduced | 2 bit reduction |
|---|---|
| 0000 | 00 |
| 0001 | 01 |
| 0010 | 10 |
| 0100 | 01 |
| 0101 | 10 |
| 0110 | 00 |
| 1000 | 10 |
| 1001 | 00 |
| 1010 | 01 |

The resulting set of 12 digits after performing the 4 bit to 2 bit reduction is 01 10 00 10 10 00. This set of 12 digits is then separated into groups of four to get 0100 0010 1000. The 4 bit-to-2 bit reduction is performed again (using Table 5 again), to arrive at 00 10 10.

At this stage of the process, an interim channel number is assigned a binary value of "00". The interim channel number is pre-pended to the 6 bit address 001010 giving a value of 00001010. A 4 bit to 2 bit reduction is performed to arrive at a 4 bit result which is 00 01. A 4 bit to 2 bit reduction is performed again, yielding a result of 01.

Since the result of the above operation was non-zero, the interim channel number is incremented (now has a binary value of "01"), and this interim channel number is pre-pended to the 6 bit address 001010, giving a value of 01001010. A 4 bit to 2 bit reduction is performed to arrive at a 4 bit result which is 0101. A 4 bit to 2 bit reduction is performed again, yielding a result of 10.

Since the result of the above operation was non-zero, the interim channel number is incremented again (now has a binary value of "10"), and this interim channel number is pre-pended to the 6 bit address 001010, giving a value of 10001010. A 4 bit to 2 bit reduction is performed to arrive at a 4 bit result which is 1001. A 4 bit to 2 bit reduction is performed again, yielding a result of 00. Since this result was "00", the interim channel number of "10", which is not incremented here, is the channel number that the program address will be mapped into, thus the program address will be mapped into channel 2. The above process performs a modulo 3 arithmetic operation to arrive at a channel number for the program address.

Once the channel number is determined, table 3 is used to map the program address to a physical address within the channel. While the example below describes mapping an address into one of three memory channels with a total of 4 GB of memory distributed such that channel 0 contains 2 GB of memory, channel 1 contains 1 GB of memory and channel 2 contains 1 GB of memory, it is understood that the same concepts apply to other systems having a different number of memory channels, different amounts of memory or a different allocation of memory between the channels.

In this example bits 10:7 are all "1"s, therefore bits 31:7 are right shifted by 6 bits, yielding the number 0296D0BE. Next the appropriate value from table 3 (values in table 3 are decimal, and therefore need to be converted) is added to 0296D0BE. This value is 7864320. The addition of 7864320 to 0296D0BE yields 0A1D13DE. This value then has bits 6:0 appended to the end of it to yield the physical address within the channel, namely physical address 050E89EF00. Therefore, in accordance with one presently disclosed method for utilizing non-uniformly distributed memory in a NP, the program address of 25B42F80 is mapped into physical address 050E89EF0 in memory channel 2.

Figure 2:
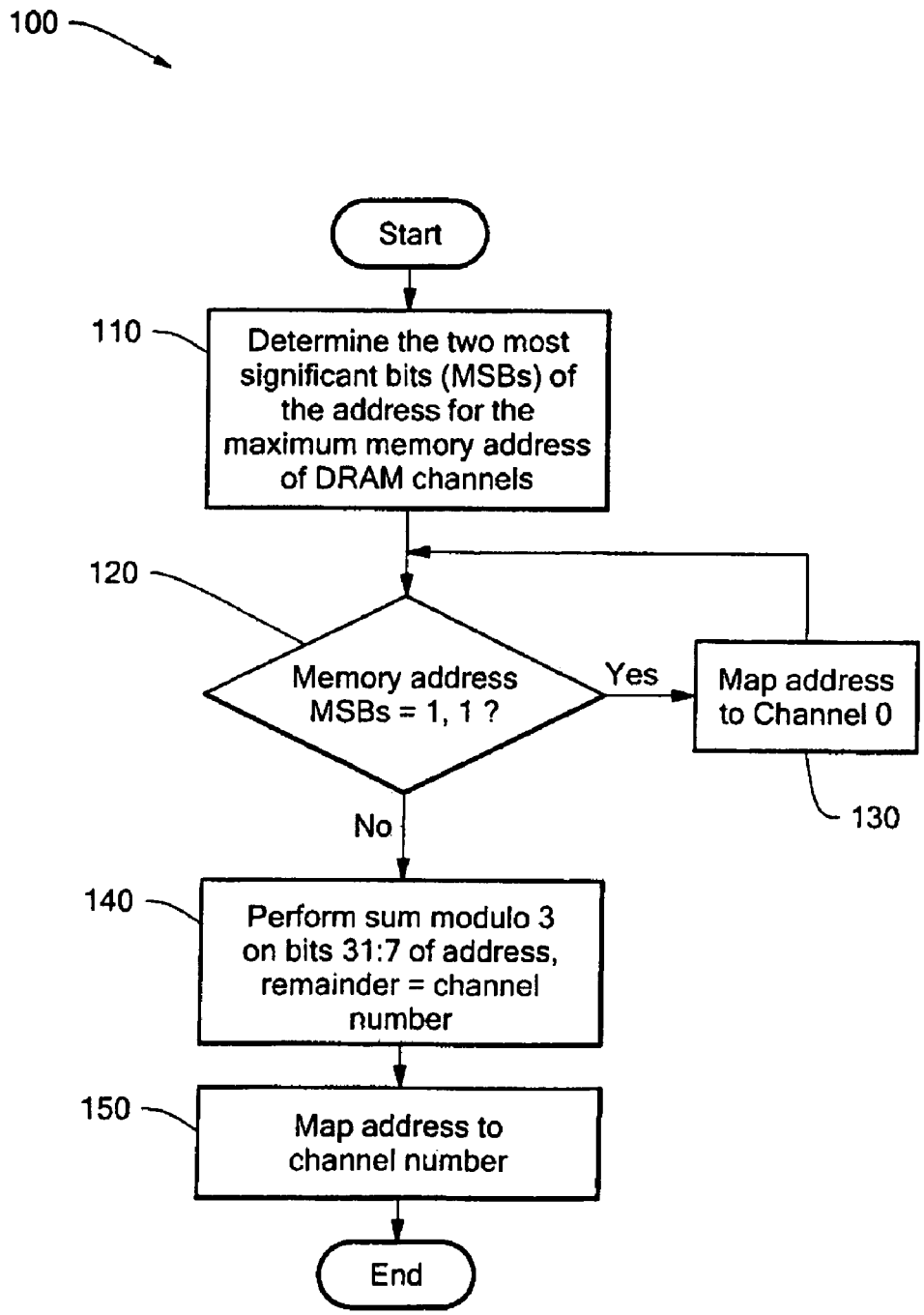
FIG. 2 is a flow chart of the method of determining a memory channel and physical block location within the channel for memory addressing.
Figure 3A:
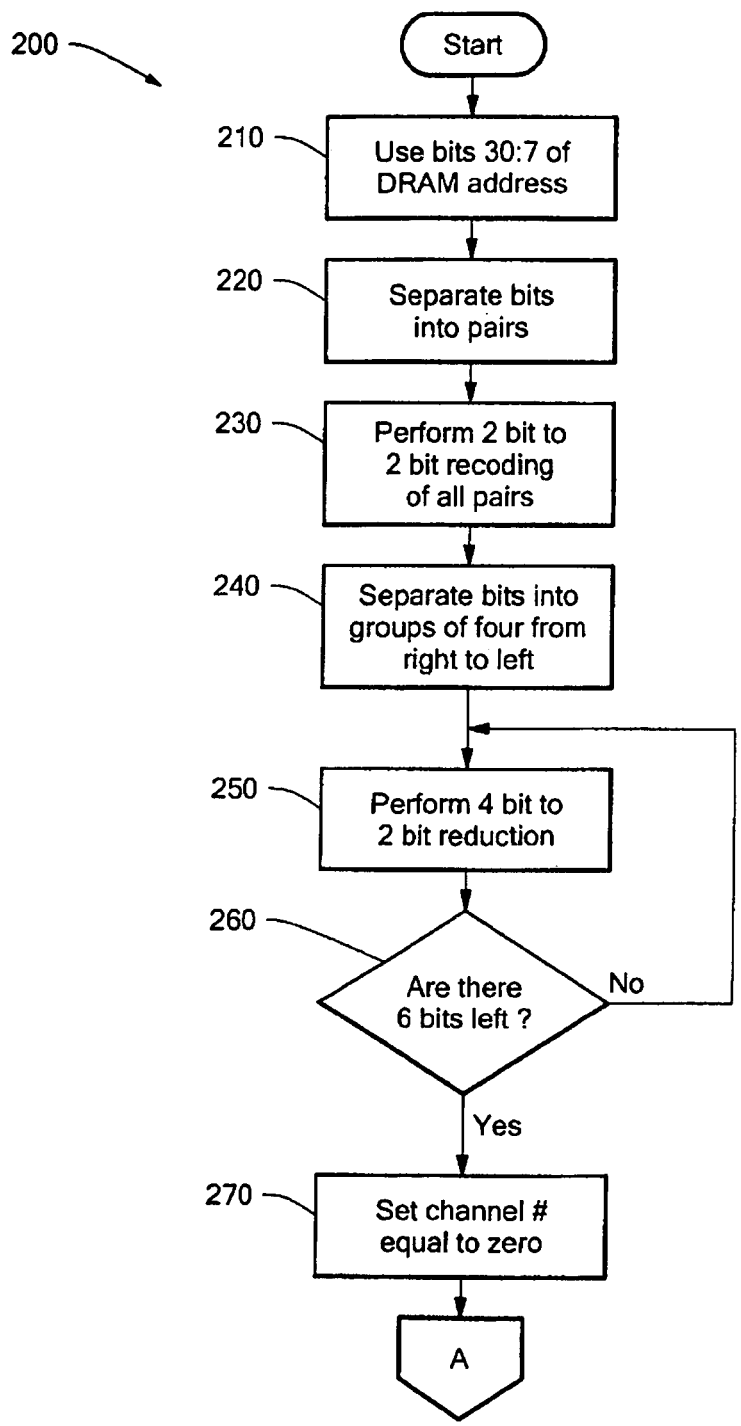
FIG. 3A is a first part of a flow diagram of the method of determining channel ownership and block allocation within a channel.
Figure 3B:
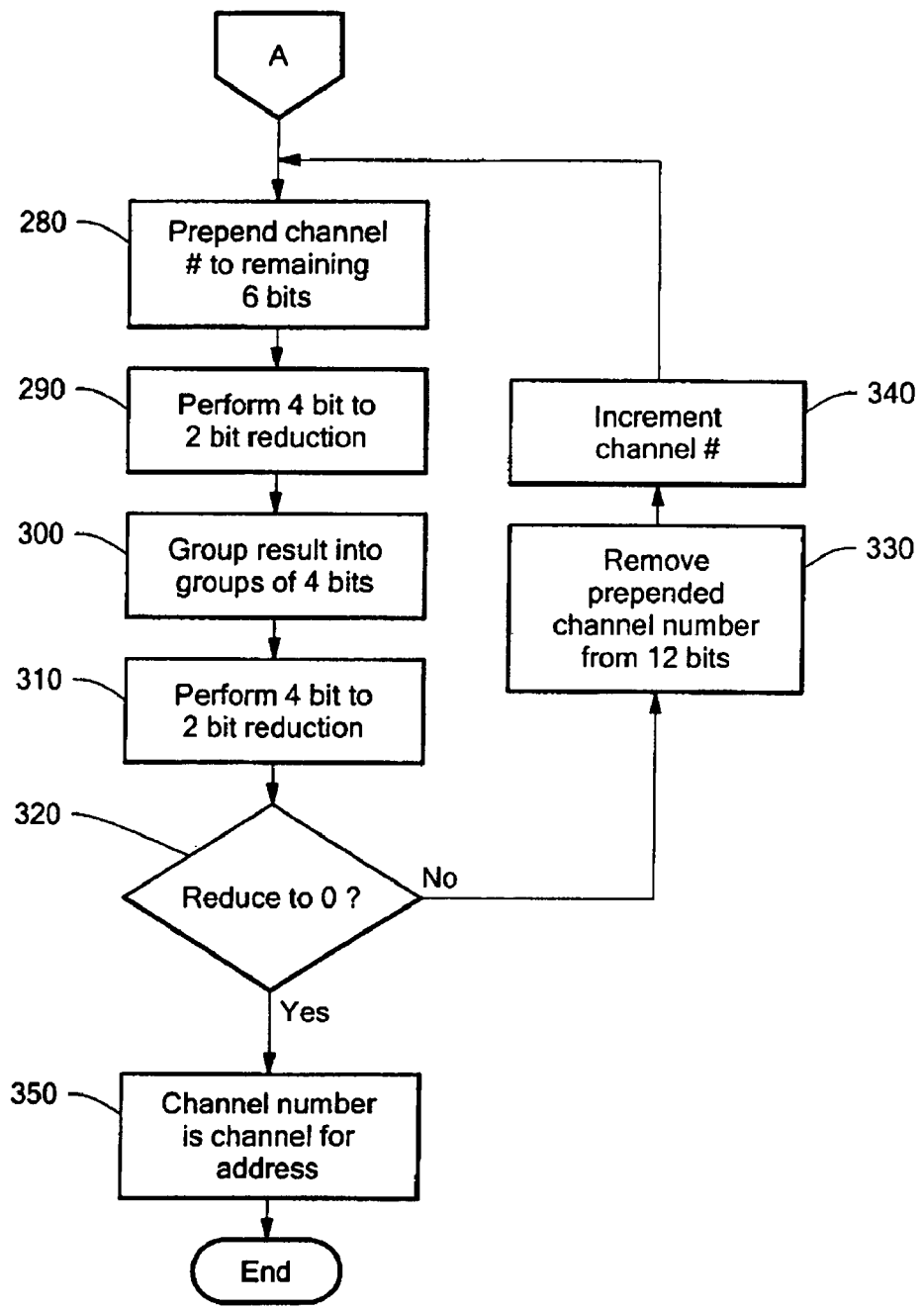
FIG. 3B is a second part of the flow chart of FIG. 3A.

A flow chart of the presently disclosed method is depicted in FIGS. 2, 3A and 3B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent processing performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present method and apparatus. It should be noted that many routine program elements, such as initialization of loops and variables and the use of temporary variables are not shown. It will be appreciated by those of ordinary skill in the art that unless otherwise indicated herein, the particular sequence of processing described is illustrative only and can be varied. Thus, unless otherwise stated the processing described below is unordered meaning that, when possible, the processing can be performed in any convenient or desirable order.

Referring now to FIG. 2, a process for determining channel ownership and physical block location within the channel in a non-uniformly distributed DRAM configuration is shown.

The process 100 starts and processing block 110 is executed. In processing block 110 the two most significant bits (MSBs) of the address for the maximum address of the DRAM channels is determined. For example, if there was a total memory capacity of 4 GB in the three memory channels, than the MSBs would be bits 31:30. In the scenario where there is a total memory capacity of 1 GB in the three memory channels than the MSBs would be address bits 29:28.

Decision block 120 is executed next wherein a determination is made whether the MSBs of the program address which is going to be mapped into a memory channel are both "1"s. When the MSBs are both "1"s, then processing continues with processing block 130. When the MSBs are not both "1"s, then processing continues with processing block 140.

When the MSBs of the program address are both "1"s (indicating the address will reside in the upper one fourth of memory) then processing block 130 is executed. Processing block 130 maps the address to a physical address in channel 0. Since the two MSBs are both "1"s, the address is not interleaved, but is mapped into a physical address in the upper half of channel 0 memory.

When the MSBs of the program address are not both "1"s (indicating that the address will reside in the lower three fourths of memory) then processing block 140 is executed. Processing block 140 performs a summing modulo 3 operation on bits 31:7 of the program address as described in detail above. The remainder resulting from this operation is the channel number the program address will mapped into.

Processing continues with processing block 150 which maps the program address into a physical address within the channel identified by processing block 140. The process 100 then ends.

Referring now to FIGS. 3A and 3B the process for determining a channel number from a program address is shown. The process 200 begins and processing block 210 is executed.

Processing block 210 uses bits 30:7 of the program address. Bits 6:0 of the program address are not used in the determination of the channel since they refer to the byte within the memory block. Processing block 220 separates the address bits 30:7 into pairs. The pairs will be used in performing a recoding of the bits. Processing block 230 performs the 2 bit to 2 bit recoding of all the pairs. "11" pairs are recoded to a "00", while all other pair combinations remain the same.

Processing block 240 separates the recoded pairs into groups of four. These groups of four will be used in performing a 4 bit to 2 bit reduction. Processing block 250 performs the 4 bit to 2 bit reduction in accordance with Table 5.

Decision block 260 determines whether there are 6 bits left in the address after performing the 4 bit to 2 bit reductions. When there are more then 6 bits left, then processing block 250 is executed again. When there are 6 bits left, processing block 270 is executed.

When the result of processing block 250 is a 6 bit value, then processing block 270 is executed. Processing block 270 sets the interim channel number to zero. Processing block 280 pre-pends the interim channel number to the 6 bit answer from processing block 250 resulting in an 8 bit value. Processing block 290 performs 4 bit to 2 bit reduction on this 8 bit value to produce a 4 bit result.

Processing block 300 performs 4 bit to 2 bit reduction on the 4 bit result from processing block 290. This operation results in a 2 bit result.

Decision block 310 determines whether the result from processing block 300 was "00". If the result is not "00" then processing continues at processing block 320. When the result from processing block 300 is "00", then the channel number is set to the current value of the interim channel number. The channel number is the memory channel the program address will be mapped into.

When the result of execution of processing block 300 is not a value of "00", then execution continues with processing block 320. In processing block 320 current value of the interim channel number is incremented. The first time through the loop comprising processing blocks 280–320 the channel number was set to zero by processing block 270. If this did not result in a zero value after the processing of block 300, then the interim channel number is incremented to a "01". If the loop of blocks 280–320 is executed again, the interim channel number would increment from a "01" to a "10".

Once processing blocks 280 through 310 produce a value of "00", the value of the interim channel number indicates the memory channel the program address will be mapped into. The process then ends.

Figure 4:
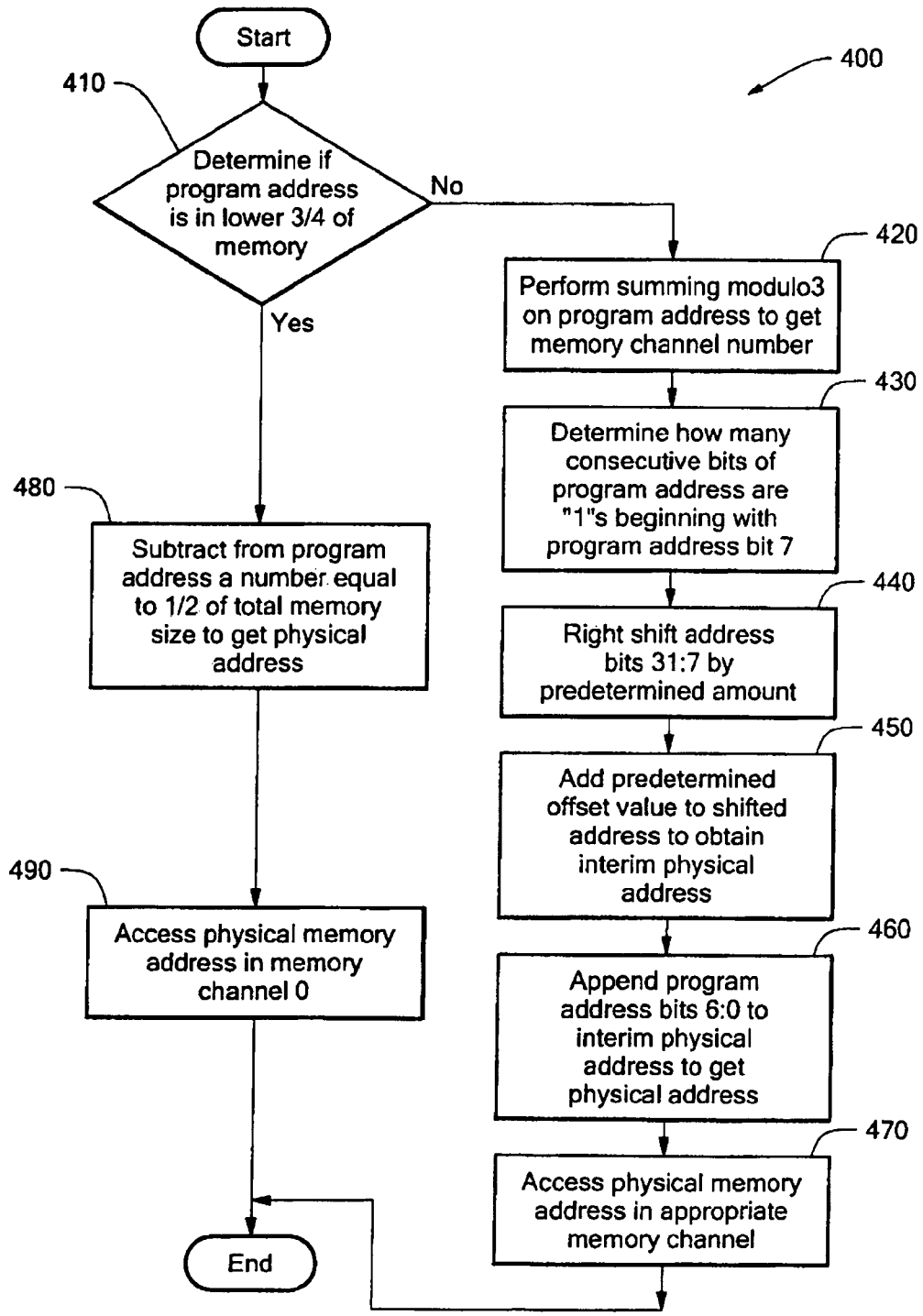
FIG. 4 is a flow diagram of a method to perform mapping of a program address into a physical address within a memory channel.

Referring now to FIG. 4, a method for performing the mapping of the program address to a physical address within one of the memory channels is shown. The process starts and decision block 410 is executed. Decision block 410 determines whether the program address references a location in the lower three/fourths of memory. If the program address references the lower three/fourths of memory then the program address will be interleaved between the three channels and processing continues at processing block 420. When the program address does not reference the lower three/fourths of memory, the program address will not be interleaved between the three channels and processing continues at processing block 420.

In processing block 420 a summing modulo 3 arithmetic operation is performed on the program address bit 31:7 to obtain the appropriate memory channel number (0, 1 or 2). Once the memory channel has been determined, the mapping of the address into the channel will be performed.

The memory mapping operation starts in processing block 430 where a determination is made regarding the number of consecutive address bits that are all "1"s, beginning with address bit 7 and working up to address bit 31. Once this value is determined, processing continues at processing block 440.

In processing block 440, address bits 31:7 of the program address are right shifted by a predetermined amount. This amount is dependent upon the number of consecutive "1"s determined in processing block 430. A reference table (e.g., Table 3 discussed above) may be used for determining the number of right shift operations to be performed on address bits 31:7 of the program address. Alternately, the number of right shift operations may be determined by other appropriate means.

Processing continues with processing block 450 wherein a predetermined offset value is added to the right shifted address to obtain an interim physical address. The predetermined offset value may also be included in the reference table, or may be determined by other means as appropriate.

In processing block 460 bits 6:0 of the program address are appended to the interim physical address to obtain the physical address. This is the physical address within the determined memory channel that the program address references.

In processing block 470 the physical address within the selected memory channel is accessed. Processing then ends.

Processing block 480 is executed when the program address does not reference the lower three/fourths of memory. In processing block 480 the program address is mapped into a physical address in memory channel 0. This is accomplished by executing the code segment described above. In effect, the code segment takes the program address and subtracts from the program address a number which is half the amount of total memory. The result from this is the physical address within memory channel 0 that this program address maps to.

In processing block 490 the physical address within memory channel 0 is accessed. Processing then ends.

Another aspect of utilizing non-uniformly distributed DRAM configurations involves detecting in-range memory address matches. To facilitate software development and debugging, for example when a memory location is being corrupted such as by an unintentional write to a location, address range checking can be performed. When software in an ME, core processor or other NP component accesses a logical address that overlaps with any one of a software-specified logical address range, the NP DRAM controller will report a match and take appropriate action.

As discussed above, NP DRAM channels are used for packet data buffering. In one embodiment each channel is striped at 128-byte boundaries. Accesses to memory can span 128 bytes starting at any 8-byte boundary. As a result, data for a single access can be returned from two neighboring channels.

In one particular embodiment a pair of matching address registers (an upper address matching register and a lower address matching register) and a control register are used to match any access that is served by this active channel. While a pair of address matching registers is described in this embodiment, it should be understood that any number of address matching registers could be used. The upper address matching register contains the upper address value for memory range checking within the channel. The lower address matching register contains the lower address value for memory range checking within the channel. The control register is used to turn address range matching on or off, and stores data relating to the type of operation to be performed when an address range match occurs.

Figure 5:
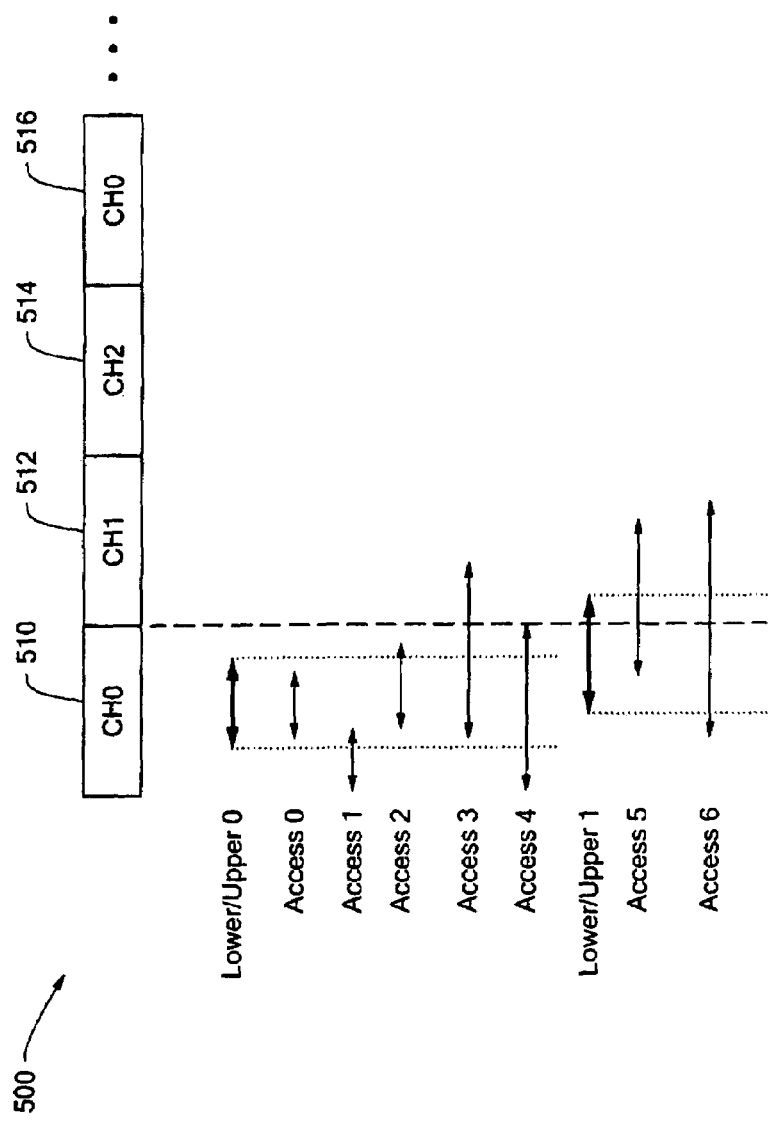
FIG. 5 is a diagram showing address matching within a predetermined range.

One or two of the 3 channels, which enqueue the DRAM requests and own the DRAM physical location for the access range, may report a match for an access. Referring now to FIG. 5 a diagram 500 showing examples regarding which channel(s) will report matching is shown. Memory is interleaved such that consecutive 128 byte blocks of memory are allocated to consecutive channels. Thus a first memory block 510 is allocated to channel 0, the next 128 byte block 512 is allocated to channel 1, the next 128 byte block 514 is allocated to channel 2, the next 128 byte block 516 is allocated to channel 0 etc.

In the diagram 500 of FIG. 5, a first lower and upper range, designated Lower/Upper 0 lies within the 128 byte block 510. Five different accesses are shown, all of which result in an address range match occurring. There are three rules for determining whether an address range match will occur. Given a lower range address and an upper range address, and a starting address and an ending address for a memory access, the rules are as follows:

An address range match will occur under any of the following conditions:

a. The starting address of the memory access lies between the lower range address and the upper range address;

b. The ending address of the memory access lies between the lower range address and the upper range address; or c. The lower range address lies between the starting address of the memory access and the ending address of the memory access.

In Access 0, since both the starting address of the memory access and the ending address of the memory access lie within the lower range address and the upper range address, channel 0 will report a range match.

Access 1 has a starting address that lies outside of the lower range address and the upper range address, but has an ending address that lies within the lower range address and the upper range address, therefore channel 0 will report a range match.

Access 2 has a starting address that lies within the lower range address and the upper range address, and an ending address that lies outside of the lower range address and the upper range address, therefore channel 0 will report a range match.

Access 3 has a starting address that lies within the lower range address and the upper range address, but has an ending address that lies outside of the lower range address and the upper range address and which extends beyond a 128 byte boundary (e.g. from block 510 and into block 512). In this instance channel 0 will report a range match.

Access 4 has a starting address that lies before the lower range address and has an ending address that lies beyond the upper range address, thus, Access 4 extends beyond and includes the lower range address and the upper range address. Accordingly, channel 0 will report a range match.

A second lower and upper range, designated Lower/Upper 1 begins in block 510 and extends into block 512, thus traversing a 128 byte block boundary.

Access 5 has a starting address that lies within the lower range address and upper address range and has an ending address that lies beyond the upper range address. In this case, since the access matches an address range extending from in channel 0 and into channel 1, both channel 0 and channel 1 will report a range match.

Access 6 has a starting address that lies before the lower range address and has an ending address that lies beyond the upper range address, thus, Access 6 extends beyond and includes the lower range address and the upper range address. Accordingly, since the access matches an address range extending from in channel 0 and into channel 1, both channel 0 and channel 1 will report a range match.

Once an address match is identified, the system can perform one of several different actions. The core processor can be interrupted, the pending memory operation can be aborted, a halt can be executed, or an exception can be sent to the ME. Other operations could also be performed in response to an address match occurrence. While the address match operation has been described with respect to performing software debugging, the address match mechanism could also be provided as a security measure to prevent attempts to overwrite program code by a nefarious user (i.e., a hacker).

Software is responsible for specifying appropriate logical address ranges in channels of their physical DRAM location. In a configuration where three channels are populated, 6 pairs of ranges in total can be specified in the system, i.e., 2 pairs in each channel. Alternatively, identical two ranges can be duplicated in all three channels, so that software does not have to calculate the physical locations of logical address ranges to be matched.

Figure 6:
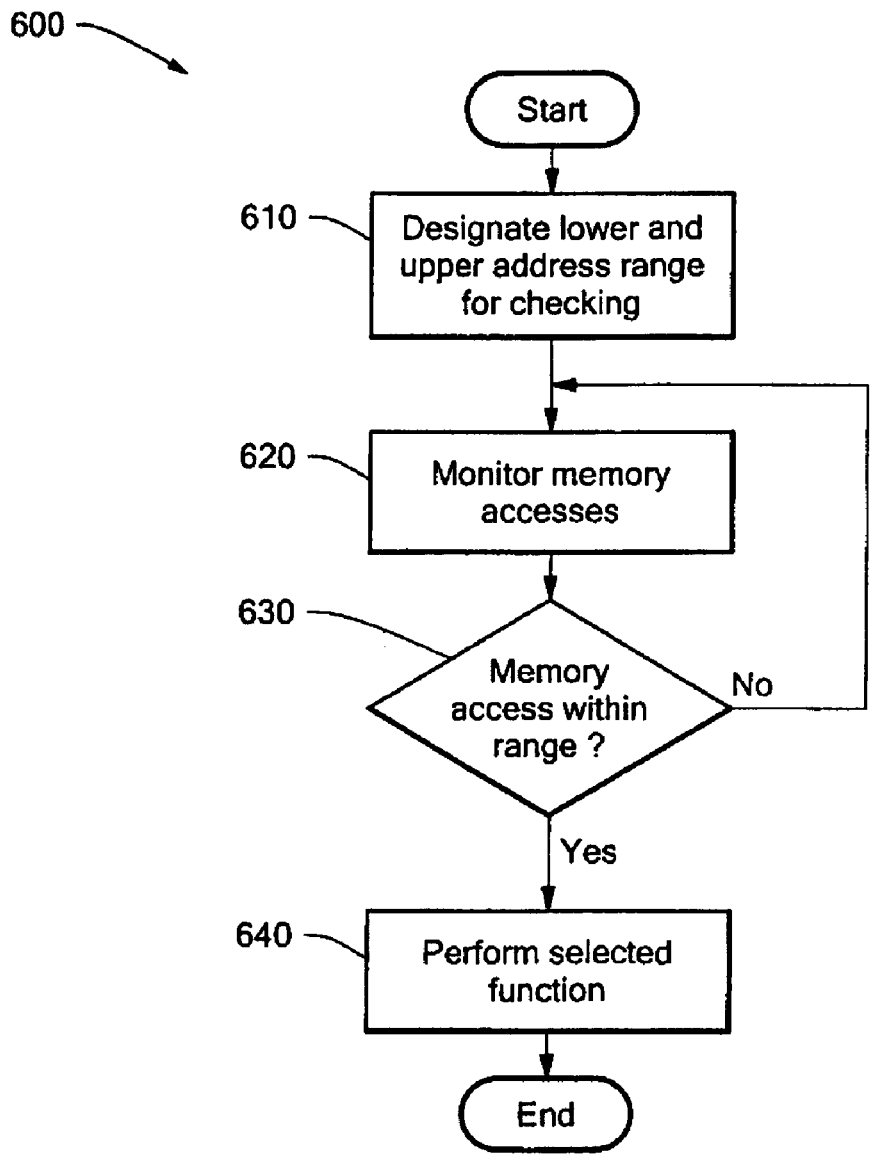
FIG. 6 is a flow diagram of a method to detect in-range memory address matches.

Referring now to FIG. 6, a flow diagram of a method 600 for performing address range checking is shown. The process 600 starts and processing block 610 is executed. In processing block 610 the upper and lower addresses for the range checking are designated. The range specified by the upper and lower addresses may span a 128 byte block of memory, and therefore cross a boundary from one channel and into another channel.

Processing continues with processing block 620, where memory accesses are monitored. The beginning address of the memory access as well as the ending address of the memory access are considered as part of the monitor operation.

In decision block 630 a determination is made regarding whether the memory access falls into the range defined by the upper and lower range addresses. When the memory access is not within the range defined the upper and lower range addresses, processing continues at block 620. When the memory access is within the range specified by the upper and lower addresses, then processing continues with processing block 640.

In processing block 640, once an address range match has occurred, an action is taken. Potential actions taken include, but are not limited to, interrupting the core processor, aborting the pending memory operation, executing a halt, or sending an exception to the ME. Other actions could also be taken in response to an address match occurring. Following processing block 640, processing ends.

Having described particular embodiments, it will now become apparent to those of ordinary skill in the art that other embodiments incorporating these concepts may be used. Additionally, the software may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the present application should not be limited to the described embodiments but rather should be limited only by the spirit and scope of the appended claims.

What is claimed is:

1. A method comprising:
   assigning a first memory to a first memory channel;
   assigning a second memory to a second memory channel; the first memory being equal in memory size to the second memory;
   assigning a third memory to a third memory channel; the third memory comprising a first memory portion being equal in memory size to the first memory and comprising a second memory portion;
   interleaving the first memory, the second memory and the first memory portion of the third memory in a three-way interleaving;
   determining a selected memory channel from the first memory channel, the second memory channel and the third memory channel for a program address; and
   mapping said program address to a physical address within said selected memory channel.

2. The method of claim 1 wherein said determining a selected memory channel comprises:
   determining whether the program address accesses an interleaved portion of memory and when said program memory address does access an interleaved portion of memory then performing an operation on said program address to obtain a memory channel number and when said program memory address does not access an interleaved portion of memory then selecting the memory channel containing non-interleaved memory.

3. The method of claim 2 wherein said determining whether the program address accesses an interleaved portion of memory comprises determining whether the program address accesses a lower three/fourths of memory.

4. The method of claim 2 wherein said performing an operation on said program address comprises performing summing modulo three arithmetic on at least a portion of said program address to obtain a remainder, said remainder comprising the memory channel number.

5. The method of claim 1 wherein said mapping said program address to a physical address comprises:
   determining whether the program address accesses an interleaved portion of memory and when said program memory address does access the interleaved portion of memory then performing address interleaving of said program address and when said program memory address does not access the interleaved portion of memory then subtracting a predetermined value from said program address to obtain a physical address in the selected memory channel.

6. The method of claim 1 wherein said interleaving comprises:
   determining the number of consecutive bits of a predetermined portion of the program address bits that are ones;
   right shifting program address bits by a predetermined number of bits to obtain a shifted address;
   adding a predetermined offset value to the shifted address to obtain an interim physical address; and
   appending a predetermined number of program address bits to said interim physical address to obtain a physical address within said selected memory channel.

7. A system comprising
a network processor; and
a plurality of memory channels in communication with said network processor, the plurality of memory channels comprising a first memory channel access a first memory, a second memory channel accessing a second memory and a third memory channel accessing a third memory, the first memory being equal in memory size to the second memory, the third memory comprising a first memory portion being equal in memory size to the first memory and comprising a second memory portion, wherein the first memory, the second memory and the first memory portion of the third memory are configured to be interleaved in a three-way interleaving.

8. The system of claim 7 wherein said network processor determines a memory channel for a memory access by determining whether said memory access is to an interleaved portion of memory and if the access is to an interleaved portion then performing an operation on said program address and when said program memory address does not access an interleaved portion of memory then selecting the memory channel containing non-interleaved memory.

9. The system of claim 7 wherein said network processor maps said program address to a physical address by determining whether the program address accesses an interleaved portion of memory and when said program memory address does access the interleaved portion of memory then performing address interleaving of said program address and when said program memory address does not access the interleaved portion of memory then subtracting a predetermined value from said program address to obtain a physical address in the selected memory channel.

10. An article comprising:
a storage medium having stored thereon instructions that when executed by a machine result in the following:
assigning a first memory to a first memory channel;
assigning a second memory to a second memory channel; the first memory being equal in memory size to the second memory;
assigning a third memory to a third memory channel; the third memory comprising a first memory portion being equal in memory size to the first memory and comprising a second memory portion;
interleaving the first memory, the second memory and the first memory portion of the third memory in a three-way interleaving;
determining a selected memory channel from the first memory channel, the second memory channel and the third memory channel for a program address; and
mapping said program address to a physical address within said selected memory channel.

11. The article of claim 10 wherein said determining a selected memory channel comprises:
determining whether the program address accesses an interleaved portion of memory and when said program memory address does access an interleaved portion of memory then performing an operation on said program address to obtain a memory channel number and when said program memory address does not access an interleaved portion of memory then selecting the memory channel containing non-interleaved memory.

12. The article of claim 10 wherein said mapping said program address to a physical address comprises:
determining whether the program address accesses an interleaved portion of memory and when said program memory address does access the interleaved portion of memory then performing address interleaving of said program address and when said program memory address does not access the interleaved portion of memory then subtracting a predetermined value from said program address to obtain a physical address in the selected memory channel.

13. The method of claim 1 further comprising:
designating a range of addresses defined as the memory between an upper address to perform range checking and a lower address to perform range checking;
monitoring memory accesses; and
determining if any of said memory accesses occur within said range of addresses and in response to a memory access occurring with said range of memory addresses then performing a predetermined operation.

14. The method of claim 13 wherein said performing a predetermined operation comprises performing an operation selected from the group consisting of interrupting the core processor, aborting the pending memory operation, executing a halt, and sending an exception.

15. The method of claim 13 wherein said determining if any of said memory accesses occur within said range of addresses comprises determining at least one of the group consisting of determining if the starting address of the memory access lies between said upper address and said lower address, determining if the ending address of the memory access lies between said upper address and said lower address, and determining if the lower address lies between the starting address of the memory access and the ending address of the memory access.

16. The method of claim 13 wherein said upper address and said lower address are located in different blocks of memory.

17. The method of claim 13 wherein said starting address of a memory access and an ending address of the memory access are located in different blocks of memory.

18. The article of claim 10 wherein said instructions that when executed by a machine further result in the following:
designating a range of addresses defined as the memory between an upper address to perform range checking and a lower address to perform range checking; and
monitoring memory accesses and determining if any of said memory accesses occur within said range of addresses and in response to a memory access occurring with said range of memory addresses then performing a predetermined operation.

19. The article of claim 18 wherein said performing a predetermined operation comprises performing an operation selected from the group consisting of interrupting the core processor, aborting the pending memory operation, executing a halt, and sending an exception.

20. The article of claim 18 wherein said determining if any of said memory accesses occur within said range of addresses comprises determining at least one of the group consisting of determining if the starting address of the memory access lies between said upper address and said lower address, determining if the ending address of the memory access lies between said upper address and said lower address, and determining if the lower address lies between the starting address of the memory access and the ending address of the memory access.

21. The article of claim 18 wherein said upper address and said lower address are located in different blocks of memory.

22. The article of claim 18 wherein said starting address of a memory access and an ending address of the memory access are located in different blocks of memory.

* * * * *